United States Patent
Phillips et al.

[11] 3,883,658
[45] May 13, 1975

[54] METHOD OF TREATING NEMATODE INFESTATIONS

[75] Inventors: Arthur P. Phillips, Raleigh; Robert B. Burrows, Cary, both of N.C.

[73] Assignee: Burroughs Wellcome Co., Research Triangle Park, N.C.

[22] Filed: May 24, 1971

[21] Appl. No.: 146,549

Related U.S. Application Data

[63] Continuation-in-part of Ser. No. 760,966, Sept. 19, 1968, Pat. No. 3,641,012, and a continuation-in-part of Ser. No. 760,965, Sept. 19, 1968, abandoned.

[52] U.S. Cl. ............................................. 424/270
[51] Int. Cl. ........................ A01n 9/02; A61k 27/00
[58] Field of Search .......... 424/270; 260/240.9, 302

[56] References Cited
UNITED STATES PATENTS

| | | | |
|---|---|---|---|
| 3,075,975 | 1/1963 | Phillips et al. | 260/240.9 |
| 3,085,935 | 4/1963 | Phillips et al. | 424/248 X |
| 3,471,620 | 10/1969 | Holan et al. | 424/270 |
| 3,641,012 | 2/1972 | Phillips et al. | 260/240.9 |

OTHER PUBLICATIONS

Sych. Ukrain. Khim. Zhur., 24, 79–88, (1958), (same as C.A. 52; 18377b–18378d).
Remington's Pharmaceutical Sciences, 13 ed., p. 566, (1965).
Venkataroman, "The Chemistry of Synthetic Dyes," Vol. II, pp. 1185–1186, (1952).

*Primary Examiner*—Albert T. Meyers
*Assistant Examiner*—Leonard Schenkman
*Attorney, Agent, or Firm*—Dike, Bronstein, Roberts, Cushman & Pfund

[57] ABSTRACT

A method of eliminating parasitic nematodes inhabiting a mammal which comprises orally administering to said mammal a nematocidally effective amount of a compound of the Formula I

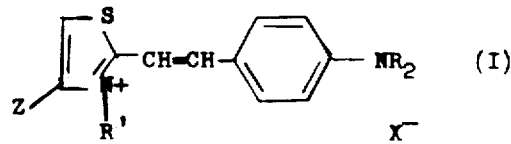

in the above formula $R'$ is lower alkyl, $NR_2$ is diloweralkylamino or pyrrolidino, Z is p-halogenophenyl, p-lower alkoxy phenyl, p-phenoxy phenyl, p-biphenylyl, phenyl, p'-lower alkoxy-p-biphenylyl or $\beta$-napthyl and $X^-$ is an anion of a pharmaceutically acceptable acid. Composition including the compound of the above Formula I are suitable for oral administration.

43 Claims, No Drawings

METHOD OF TREATING NEMATODE INFESTATIONS

This application is a continuation-in-part of U.S. Pat. application Ser. No. 760,966 filed Sept. 19, 1968, now U.S. Pat. No. 3,641,012 and U.S. Pat. application Ser. No. 760,965 filed Sept. 19, 1968, now abandoned.

The present invention is directed to a method of eliminating nematodes, i.e., pinworms, hookworms, whipworms and other types inhabiting a mammal particularly the intestinal tract thereof by administering an effective amount of a 2-(p-tertiary aminostyryl) thiazolium salt. In this invention, the preferred effective amount for a single dose is 5-25 mg of cation /kg of body weight of the mammal being treated.

Tests have shown that the method of treatment of this invention is effective against *Ancylostoma canium* (of dogs), *Ancylostoma tubaeforme* (of cats), *Toxocara canis* (of dogs), *Trichuris vulpis* (in dogs), *Syphacia obvelata* (in mice), *Nippostrongylus brasiliensis* (in rats). All of these parasites except the last two are of inherent practical interest. *Syphacia obvelata* is a pinworm of mice which has been widely considered to be a reliable guide in the discovery of compounds active against *Enterobius vermicularis*, the pinworm of man. These compounds are represented generally by Formula I

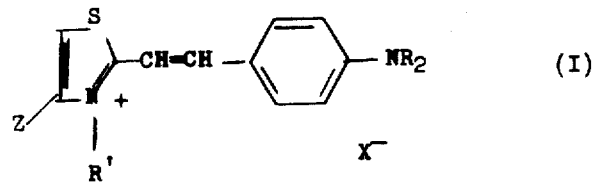

wherein $NR_2$ is diloweralkylamino, where the alkyl is methyl, ethyl or propyl, and is preferably dimethylamino, diethyl amino or is pyrrolidino, R' is methyl, ethyl, propyl and is preferably methyl or ethyl and Z is selected from the class consisting of phenyl, p-halogenophenyl, preferably p-bromophenyl or p-chlorophenyl, p-loweralkoxy (1 to 3 carbons) phenyl, preferably p-methoxyphenyl, p-phenoxyphenyl, p-biphenylyl, p-loweralkoxy (1 to 3 carbon atoms) biphenylyl, that is p'-loweralkoxy-p-biphenylyl, sometimes written as p-p' biphenylyl lower alkoxy or p-p'-$C_6H_4C_6H_4$ loweralkoxy, preferably p'-methoxy-p-biphenylyl(p-p'-$C_6H_4C_6H_4OCH_3$) and naphthyl, preferably β-naphthyl and $X^-$ is the anion of a pharmaceutically acceptable acid and is one that is not itself markedly toxic. Of the compounds of this invention the following styryl thiazolium salts of the Formulas IA or IB having a substituent Z that are p-biphenylyl or p'-loweralkoxy-p-biphenylyl are particularly useful in treating nematode infestations.

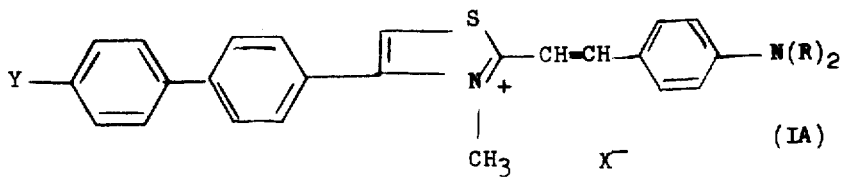

where Y is hydrogen or lower alkoxy (methoxy, ethoxy, propoxy, etc.), $X^-$ is an anion of a pharmaceutically acceptable acid R is lower alkyl (methyl, ethyl, propyl, etc.) and

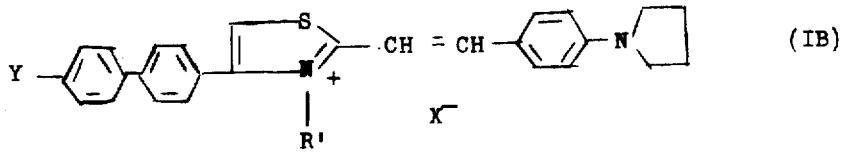

where Y is hydrogen or lower alkoxy, (methoxy, ethoxy, propoxy, etc.) $X^-$ is an anion of a pharmaceutically acceptable acid, and R' is lower alkyl.

Especially preferred are the variants II, which has been shown to eliminate hookworms from dogs (*Ancylostoma caninum* and *Uncinaria stenocephala*) and cats (*Ancylostoma tubaeforme*) at doses of 5mg/kg and has an oral $LD_{50}$ (in mice) of 1650mg/kg.

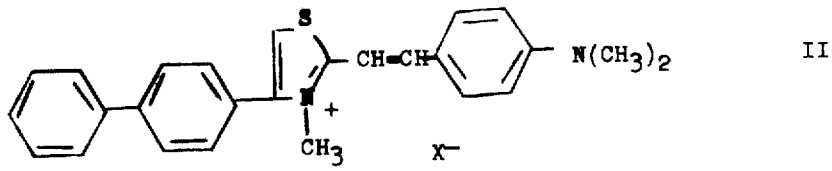

and III

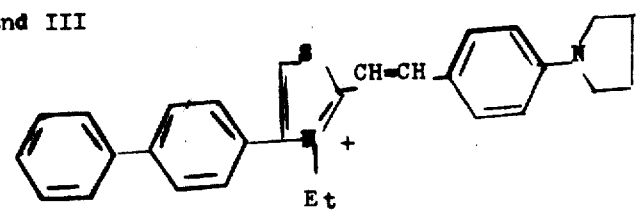

which is highly active against pinworms. In the above $E_t$ is the well known abbreviation for ethyl or $C_2H_5$.

Considerable variation in activity against different parasites exists within this series. In general, maximal activity against hookworms in the Formula I is found with R=R'=methyl. Activity against *Syphacia obvelata* is highest when R' is ethyl and $NR_2$ is pyrrolidino. All of the compounds of Examples 1–25 however, eliminate hookworms from dogs at doses of the order of 25mg base/kg or clear mice of Syphacia at doses of 100mg base /kg or less.

Compounds of Examples 4, 5, 9 and 10 have been reported previously (*Chem. Abs.*,17, 1024'(1923), 40, 1519[4](1946), 52, 18377[d] (1958),18,264[4](1924) respectively) mainly in connection with photographic studies. There is no indication up to the present that their anthelmintic properties had been investigated. The especially preferred variants having Z = biphenylyl (Ex. 1, and 11–14)are believed to be new.

The compounds of this invention are prepared by the following route:

Conveniently, however, $X^-$ is introduced in step $c$ through the alkylating agent R'X which, to prepare II, would be methyl iodide or methyl sulfate. The most conveniently prepared salts of II are thus the iodide and methyl sulfate. If methyl bromide were employed in step $c$, the bromide of II would result. The chloride can be prepared from the iodide by shaking with silver chloride in alcoholic solution and other salts by appropriate conventional procedures.

The compounds of the present invention are conveniently prepared as more particularly shown for Y= lower alkoxy or hydrogen, R' is lower alkyl, and $NR_2$ is dialkylamino or pyrrolidino by the following reaction sequence:

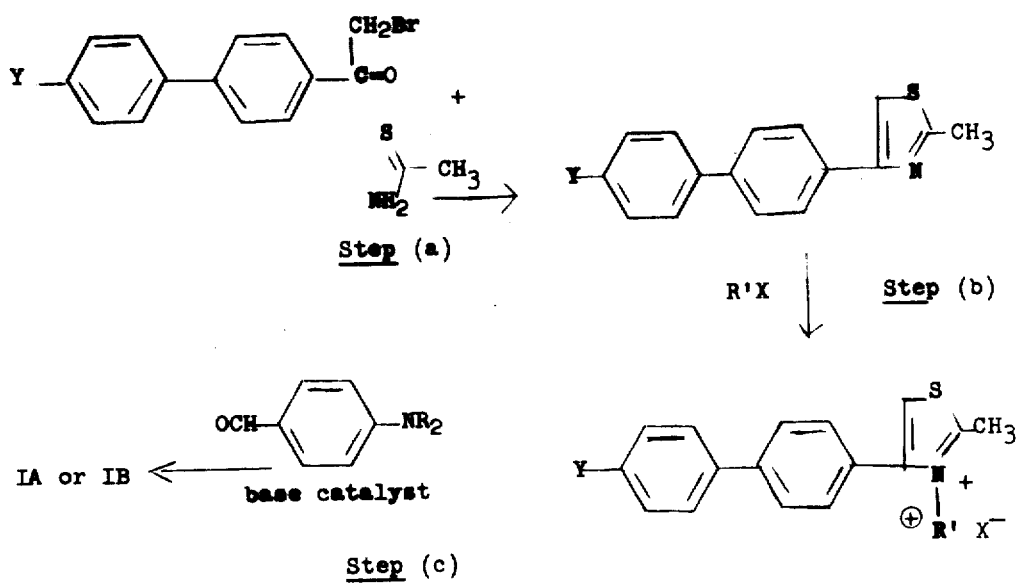

where $R^{40}$ is as above.

While many values of $X^-$ are comprehended in this invention, the most convenient way of introducing $X^-$ is in step $b$ and it is therefore preferred to have $X^-$ correspond to the X of an R'X that is a satisfactory alkylating agent. Thus when R'X is methyl or ethyl, iodide or bromide, the variants of I having X = I and Br are obtained directly whereas a chloride would have to be prepared from the iodide (or bromide) by a separate operation (as by exchange with silver chloride). The variants in which $X^-$ is a hydrocarbyl sulfonate (especially p-toluene sulfonate or methane sulfonate) are

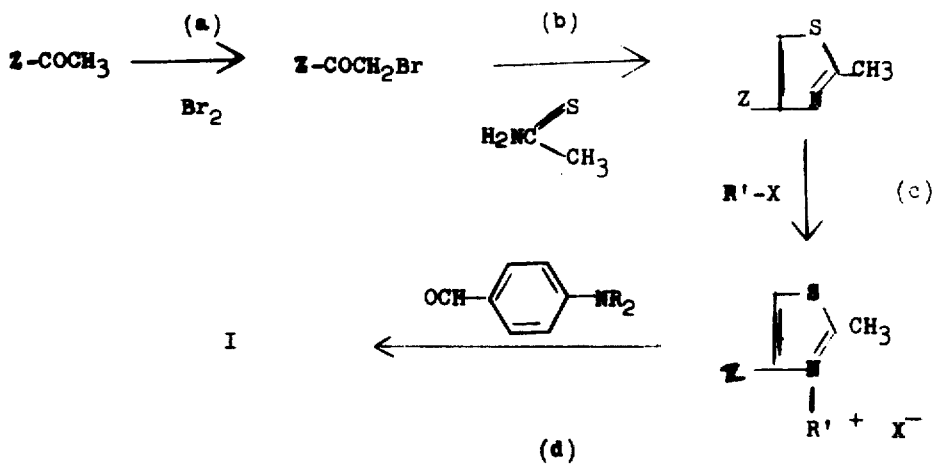

The anion, $X^-$, does not contribute to the parasiticidal activity of the compounds and its identity is relatively unimportant provided it is not itself markedly toxic. Thus $X^-$ can be $Cl^-$, $Br^-$, $I^-$, $SO_4^=$, $MeOSO_3^-$ or the like.

also prepared by using the appropriate sulfonate ester as R'X in step b. Similarly methyl sulfate may be employed to give the methyl sulfate salt. In general, the iodides are extremely satisfactory and are usually preferred. The anion X⁻ does not contribute to the parasiticidal activity of the compounds and its identity is unimportant provided it is not itself markedly toxic, thus anions of pharmaceutically acceptable acids such as $Cl^-, Br^-, I^-, SO_4^=, MeSO_4^=$ or the like are suitable for the purposes of this invention.

The compounds of this invention are almost completely insoluble in water and are rather sparingly soluble in most organic solvents. They are frequently obtained in hydrated forms from which the water of crystallization is not readily removed. The higher-melting salts are not readily recrystallized and purity is best obtained by ensuring the purity of the reactants in step c (and especially their freedom from dust and inorganic contaminants) and by extracting the product several times with organic solvents such as methanol.

The compounds of this invention can be administered to the host of the parasites in any fashion customary for such purposes as, for example, in a capsule or a suspension in water or syrup or embedded in a cube of gelatine or in a compressed tablet. Since, however, hookworms inhabit mainly the duodenum any tablet intended to eliminate them should be such as to disintegrate rapidly after being swallowed. This would be less important if pinworms or whipworms which inhabit lower portions of the intestinal tract are the objects of treatment. Against hookworms, incorporation of the powered drug in food is often advantageous.

EXAMPLE 1

Step b

27.5 grams (0.1M) of p-phenyl phenacyl bromide and 10 grams (0.133M) of thioacetamide were mixed and heated in 150 cc. of methanol. The reaction mixture developed a strong acidic reaction almost at once. After heating at 100° for 1–2 hours part of the methanol was evaporated, water and ammonia were added thus precipitating the thiazole base. This was collected and purified by recrystallization from methanol and gave 23 grams of colorless crystals (90–95% yield) melting at 120°–121°C.

Step c

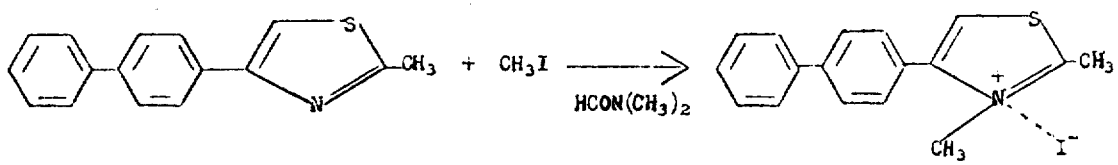

A solution of 25 grams (0.1M) of 2-methyl-4-biphenylyl thiazole and 22 grams of methyl iodide in 70 cc. of dimethylformamide was heated for 6–8 hours at 100C. Upon addition of excess ether, and cooling, there was obtained 30–32 grams (75–80%) of the methiodide product. After purification by digesting with hot methanol this had a melting point of 272°–273°C.

Step d

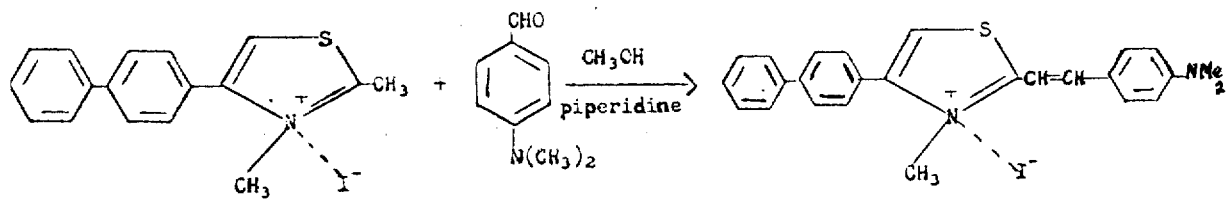

A suspension of 7.9 grams (0.02M) of the thiazole methiodide and 4.5 grams (0.03+M) of p-dimethylaminobenzaldehyde in 90 cc. of hot methanol containing 2cc. of piperidine was heated at 100° (steam bath) for 2 hours. An insoluble red precipitate was found in less than 5 minutes — but because the starting compound (thiazole methiodide) was rather insoluble in methanol — the reaction mixture was digested hot for about 2 hours to ensure nearly complete transformation of this insoluble reactant into the insoluble product. The product was collected, 10.5 grams (100%) from the cooled methanol and the solid was washed well with methanol and with ether. After purification by digestions with hot methanol and washings with methanol and ether there was obtained 10 grams (95±%) of red crystals melting at 255°–256°C.

Example 1 the following variants of Formula I were prepared, all salts being characterized as iodides.

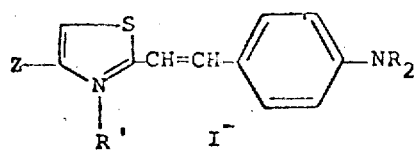

| Example | Z | R' | NR$_2$ | Yield,% | M.P., °C |
|---|---|---|---|---|---|
| 4 | C$_6$H$_5$ | CH$_3$ | N(CH$_3$)$_2$ | 95 | 238–239 |
| 5 | C$_6$H$_5$ | CH$_3$ | N(C$_2$H$_5$)$_2$ | 80 | 216–218 |
| 6 | C$_6$H$_5$ | CH$_3$ | N(CH$_2$)$_4$ | 90 | 234–235 |
| 7 | p—ClC$_6$H$_4$ | CH$_3$ | N(CH$_2$)$_4$ | 95 | 219–220 |
| 8 | p—CH$_3$OC$_6$H$_4$ | CH$_3$ | N(CH$_3$)$_2$ | 95 | 216–217 |
| 9 | p—CH$_3$OC$_6$H$_4$ | CH$_3$ | N(C$_2$H$_5$)$_2$ | 95 | 191–192 |
| 10 | β—Naphthyl | CH$_3$ | N(CH$_3$)$_2$ | 90 | 220–222 |
| 11 | p—C$_6$H$_5$C$_6$H$_4$ | C$_2$H$_5$ | N(CH$_3$)$_2$ | 90 | 233–235 |
| 12 | p—C$_6$H$_5$C$_6$H$_4$ | CH$_3$ | N(C$_2$H$_5$)$_2$ | 95 | 208–209 |
| 13 | p—C$_6$H$_5$C$_6$H$_4$ | CH$_3$ | N(CH$_2$)$_4$ | 90 | 262–263 |
| 14 | p—C$_6$H$_5$C$_6$H$_4$ | C$_2$H$_5$ | N(CH$_2$)$_4$ | 90 | 264–265 |
| 15 | p—ClC$_6$H$_4$ | CH$_3$ | N(C$_2$H$_5$)$_2$ | 90–95 | 190–191 |
| 16 | p—BrC$_6$H$_4$ | CH$_3$ | N(C$_2$H$_5$)$_2$ | 90 | 208–209 |
| 17 | p—BrC$_6$H$_4$ | C$_2$H$_5$ | N(CH$_2$)$_4$ | 75–85 | 223–225 |
| 18 | p—PhOC$_6$H$_4$ | CH$_3$ | N(CH$_3$)$_2$ | 70–80 | 237–238 |
| 19 | P—PhOC$_6$H$_4$ | CH$_3$ | N(CH$_2$)$_4$ | 80–85 | 214–215 |
| 20 | p—MeOC$_6$H$_4$—C$_6$H$_4$ | CH$_3$ | N(CH$_2$)$_4$ | 85–90 | 279–280 |
| 21 | p—MeOC$_6$H$_4$—C$_6$H$_4$ | CH$_3$ | N(CH$_3$)$_2$ | 85–90 | 280–281 |

EXAMPLE 2

2-(p-Dimethylaminostyryl)-3methyl-4-(p-biphenylyl) thiazolium p-toluenesulphonate.

2-Methyl-4-biphenylthiazole (25.1 grams; 0.100mole), dimethyl-formamide (100ml.) and methyl-p-toluenesulphonate (37.2 grams; 0.200 mole were mixed and heated on the steam bath at 80°–90°C for a period of 43 hours. The solid which crystallized on cooling was filtered, washed with ether and recrystallized from isopropanol to give a product melting at about 180°–182°C.

2,3-Dimethyl-4-p-biphenylylthiazolium p-toluenesulphonate (26.0 grams; 0.594 mole), p-dimethylaminobenzaldehyde (13.4 grams; 0.0893 mole), methanol (275 ml.) and piperidine (6.3 ml.) were mixed and heated at reflux for 19 hours. The red solid which crystallized on cooling was filtered, washed with ether and recrystallized from methanol to give a product melting at about 248°–254°C.

EXAMPLE 3

2-(p-Dimethylaminostyryl)-3-methyl-4-(p-biphenylyl thiazolium methylsulphate.

2-Methyl-4-biphenylylthiazole (9.0 grams; 0.036 mole), dimethylformamide (40ml.) and dimethylsulphate (5.0 grams; 0.040 mole) were mixed and heated on a steam bath at 80°–90°C for a period of 18 hours. The solid which crystallized upon cooling was recrystallized from ethanol to give a product melting at about 235°–240°C (decomp.).

2,3-Dimethyl-4-p-phenylylthiazolium methylsulphate (4.0 grams; 0.0106 mole), p-dimethylaminobenzaldehyde (2.4 grams; 0.0160 mole), methanol (50ml.) and piperidine (1.0 ml.) were mixed in the cold and then heated at reflux for 18 hours. On cooling and the addition of an excess of ether a red solid was precipitated which was filtered, washed with ether and dried at 80°C to give a red-coloured solid; the product melted at about 210°–225°C.

In a further experiment, the product melted at 240°–245°C. By similiar operations, by the method of

EXAMPLE 22

(a)

2-Methyl-4-(p-biphenylylthiazole) ethiodide

A mixture of 10 grams (0.04M) of 2-methyl-4-(p-biphenylyl)-thiazole, 25 cc. of dimethylformamide, and 10 cc. of ethyl iodide was refluxed on a steam bath for 48 hours. After cooling the mixture was diluted with excess ether and gave 6.5 g. (40%) of the ethiodide. After two recrystallizations from methanol-ether mixtures 6.5 grams of purified product was obtained which melted at 236°–237°C.

The original dimethylformamide-ether soluble filtrates from the first crop - upon evaporation to dryness gave about 10 g. more of crude seconds and/or starting material. This 10 grams of seconds was refluxed for two days longer in 25cc. of DMF with 10cc. of ethyl iodide and then gave 8.5 grams of seconds m.p. 218°–220°C. After two recrystallizations from methanol-ether 6.6 grams of material melting at 229°–232°C was obtained - which was used for condensations.

(b)

2-(p-Pyrrolidinostyryl)-4-(p-biphenylyl) thiazole ethiodide

A mixture of 4.1 grams (0.01M) of the thiazole ethiodide (a), 2.7 grams (0.015M) of p-pyrrolidinobenzaldehyde, 40 cc. of methanol and 2 cc. of piperidine was heated for ½ hour on a steam bath. The dark insoluble product had precipitated in about 5-10 minutes. After cooling the product was filtered and washed first with methanol and then with ether; yield was 5.7 grams (100%). After two or three separate digestions in 80 cc. portions of hot methanol and after cooling, filtering and washing with methanol and with ether, 5.2 grams (95%) of the purified product was obtained which melted at 264°–265°C (with decomp.). The compound underwent a distinct color change at about 242°–245°C — from dark to orange-yellow — perhaps associated with the loss of ethyl iodide.

By the same procedures were prepared

EXAMPLE 23

2-[p-Pyrrolidinostyrl]-3-methyl-4-p-biphenylyl thiazolium iodide, m.p., 262°–263°.

EXAMPLE 24

2[p-Dimethylaminostyryl]-3-methyl-4-p-methoxybiphenylyl thiazolium iodide, m.p. 280°–281°C.

EXAMPLE 25

2-[p-Pyrrolidinostyryl]-3-methyl-4-p-methoxybiphenylyl thiazoium iodide, m.p. 279°–280°C.

The other compounds of this invention set forth in the general formulas IA or IB are conveniently made using the same procedures as noted above.

Test Procedures used for Testing Compounds Against Hookworms in Dogs and Cats.

All dogs and cats received by the Laboratory are examined by the zinc sulfate flotation technic (sp. gr. 1.2) for helminths harbored. Some of those found to have hookworm infections were used in these experiments. All infections treated were natural.

Each animal to be treated was in an individual cage. Dogs were changed from Gaines meal to canned dog food for the experiment, as it is easier to find helminths in feces after canned dog food, and a dish of water was in the cage at all times. Cats were given canned cat food and milk before and during the experiment.

All feces passed for 48 hours was checked for worms eliminated and the findings recorded. At the end of 48 hours the dogs and cats were necropsied and the worms remaining were counted and recorded. Worms, or portions thereof, found in the cecum or large intestine were considered as part of the last passed fecal specimen and recorded with the eliminated worms. The percentage of elimination was computed for each species of worm by dividing the total number of worms harbored into the number passed. Dogs treated for whipworm infections were followed for one week and then necropsied.

The drug was weighed out and placed in capsules.

There were three (3) methods used to administer the compound orally to the dogs and cats, they were:

1. Drug placed in gelatin capsule.
2. Drug ground in mortar and placed in capsule.
3. Drug ground in mortar and mixed with food.

The results obtained are shown in the following table. Here, Col. I, III, V, VII are fractions in which the numerator is the number of worms expelled and the denominator is the above number plus the number remaining at autopsy. Where a question mark is shown, the animal was known beforehand to have been infected but no worms could be found. It is believed that in these cases the worms had been killed and had disintegrated but such results are not given full credence.

Columns II, IV, VI and VIII show the percentage clearances.

| TRIALS OF THE PRODUCT OF EXAMPLE 1 IN DOGS | | | | | | | | | | DOSE LEVEL mg/kg |
|---|---|---|---|---|---|---|---|---|---|---|
| Drug administered in capsules | | I | II | III | IV | V | VI | VII | VIII | |
| | | A. caninum | | U. stenocephala | | T. canis (roundworms) | | T. leonina | | |
| Dog No. | 873 | 19/19 | 100% | 522/526 | 99% | | | | | 5.1 |
| | 874 | 21/22 | 96% | 33/47 | 70% | | | | | 5.9 |
| | 875 | 51/51 | 100% | 131/132 | 99% | 15/18 | 83% | | | 7.3 |
| | 883 | 3/21 | 14% | 17/56 | 30% | 5/10 | 50% | | | 6.0 |
| | 884 | 86/86 | 100% | 163/164 | 100% | | | | | 8.2 |
| | 885 | 0/1 | 90%(?) | 0/6 | 90%(?) | | | | | 5.2 |
| | 888 | 2/2 | 100% | 12/12 | 100% | | | | | 5.6 |
| | 889 | 116/116 | 100% | 417/418 | 100% | | | | | 8.2 |
| | 892 | 36/46 | 83% | | | | | | | 5.5 |
| | 893 | 641/641 | 100% | | | | | | | 9.3 |
| | 896 | 0/8 | 0% | 0/3 | 0% | | | | | 7.1 |
| | 898 | 3/3(?) | 100% | | | 1/1 | 100% | | | 7.6 |
| Drug ground and administered in capsules | | | | | | | | | | |
| | 906 | 86/127 | 67% | | | | | | | 6.8 |
| | 909 | 105/108 | 97% | | | | | | | 8.8 |
| | 910 | 5/24 | 21% | | | | | | | 5.1 |
| | 911 | 405/409 | 99% | 501/501 | 100% | | | | | 7.6 |
| Drug administered in food | | | | | | | | | | |
| | 914 | 6/6 | 100% | | | 3/5 | 60% | | | 7.6 |
| | 917 | ? | 100% | | | | | | | 7.1 |
| | 918 | 120/120 | 100% | 221/221 | 100% | | | | | 5.6 |
| | 921 | 83/83 | 100% | | | | | | | 6.9 |
| | 922 | 426/429 | 99% | | | 0/1 | 0% | | | 6.7 |
| | 933 | | | | | 5/12 | 42% | 14/14 | 100% | 9.3 |
| | 950 | 71/71 | 100% | | | | | | | 9.3 |
| | 957 | ? | 90% | | | | | | | 6.7 |
| | 960 | 115/115 | 100% | | | 8/8 | 100% | | | 9.6 |
| | 963 | ? | 100% | ? | 100% | | | 26/30 | 87% | 7.7 |
| | 975 | 13/13 | 100% | | | | | | | 5.5 |

| TRIALS OF THE PRODUCT OF EXAMPLE 1 IN CATS | | | | | | DOSE LEVEL mg/kg |
|---|---|---|---|---|---|---|
| Drug administered in capsules | | I | II | III | IV | |
| | | A. tubaeforme | | T. cati | | |
| Cat. No. | 565 | 8/9 | 89% | | | 16.6 |
| | 567 | 40/40 | 100% | 32/32 | 100% | 19.2 |
| | 569 | 21/21 | 100% | | | 17.9 |
| | 570 | 1/20 | 5% | 0/1 | 0% | 21.7 |
| | 571 | 20/20 | 100% | | | 8.6 |
| | 576 | 4/4 | 100% | 27/27 | 100% | 15.1 |
| | 577 | 1/8 | 13% | 9/11 | 82% | 25.0 |
| | 579 | 11/11 | 100% | | | 14.7 |
| | 580 | 7/7 | 100% | 1/1 | 100% | 18.5 |
| | 581 | 13/15 | 87% | 0/2 | 0% | 21.7 |

TRIALS OF THE PRODUCT OF EXAMPLE 1 IN CATS

| Drug administered in capsules | | I | II | III | IV | DOSE LEVEL mg/kg |
|---|---|---|---|---|---|---|
| | | A. tubaeforme | | T. cati | | |
| Drug ground and administered in capsules | | | | | | |
| | 583 | 8/8 | 100% | 8/8 | 100% | 29.4 |
| | 584 | 23/23 | 100% | | | 21.7 |
| | 585 | 8/8 | 100% | | | 22.7 |
| | 589 | 10/10 | 100% | | | 20.0 |
| Drug ground and administered in food | | | | | | |
| | 591 | 24/24 | 100% | 25/25 | 100% | 20.0 |
| | 596 | ? | 100% | | | 20.0 |
| | 597 | 12/12 | 100% | 1/1 | 100% | 25.0 |
| | 598 | ? | 100% | | | 21.7 |

TRIALS OF THE PRODUCT OF EXAMPLE 4.

| Drug administered in capsules to Dogs | | I | II | III | IV | DOSE LEVEL mg/kg |
|---|---|---|---|---|---|---|
| | | A. caninum | | T. canis | | |
| Dog No. | 576 | 6/11 | 54.5% | 1/1 | 100% | 25 |
| | 592 | 3/3 | 100% | | | 25 |
| | 590 | 1/1 | 100% | | | 25 |
| Drug administered in capsules to Cats | | A. tubaeforme | | T. cati | | |
| Cat No. | 447 | 10/10 | 100% | | | 15 |
| | 432 | | | 5/5 | 100% | 25 |
| | 435 | 2/2 | 100% | 11/11 | 100% | 15 |

Test Procedures used for Testing Against *Syphacia obvelata* in Mice

All mice received in our laboratory are naturally infected with *S. obvelata*.

Each mouse is placed in a separate small cage, which contains a feeding rack (designed so that food scraps do not fall through the wire mesh bottom of the cage) and a water bottle, and beneath the cage is a pan of water to catch feces and worms. Two or three cages make up a single experiment.

Each mouse is weighed, the desired amount of drug (as an emulsion made by grinding in a mortar with Tween 80 and water) is drawn up into a syringe, the blunt needle inserted into the esophagus, and the drug released into the stomach.

At the end of 24 hours the pan is removed from beneath the cage and a new pan of water substituted. The material in the removed pan is searched for worms and the findings recorded. After another 24 hours the mouse is necropsied, and any living worms remaining in the cecum are counted. The material in the second pan, as well as the feces from the large intestine, is examined for worms (fragments of worms in the cecum or large intestine are considered as passed). After all counts are recorded, the percentage of elimination is determined by dividing the total number of worms harbored in the number passed. The average percentage is obtained by averaging the percentages for all mice used in that experiment.

The results obtained are shown in the following table. Here Col. I is the experiment number, Column II are fractions in which the numerator is the number of worms expelled and the denominator is the above number plus the number remaining at autopsy and Col. III is the percentage clearance.

TRIALS OF THE PRODUCT OF EXAMPLE 14 IN MICE.

| Dose level | Mice No. | Col. I | Col. II | Col. III | | |
|---|---|---|---|---|---|---|
| 5mg/kg. | 1 | 67-A-29 | 84/84 | 100% | Avg. | 97.4% |
| | 2 | | 35/37 | 94.7% | | |
| | 3 | 67 A-30 | 103/103 | 100% | Avg. | 100% |
| | 4 | | 17/17 | 100% | | |
| | 5 | | 4/4 | 100% | | |
| | 6 | 67 A-38 | 1/4 | 25% | Avg. | 40.9% |
| | 7 | | 43/44 | 97.8% | | |
| | 8 | | 0/7 | 0% | | |
| | 9 | 67 A-39 | 34/43 | 79% | Avg. | 91.4% |
| | 10 | | 25/25 | 100% | | |
| | 11 | | 20/21 | 95.3% | | |
| 10mg/kg. | 12 | 67 A-33 | 63/63 | 100% | Avg. | 100% |
| | 13 | | 118/118 | 100% | | |
| | 14 | | 12/12 | 100% | | |
| | 15 | 67 A-34 | 5/5 | 100% | Avg. | 100% |
| | 16 | | 5/5 | 100% | | |
| | 17 | | 40/40 | 100% | | |
| | 18 | 67 A-40 | 40/40 | 100% | Avg. | 99.3% |
| | 19 | | 43/44 | 97% | | |
| | 20 | | 16/16 | 100% | | |

TRIALS OF THE PRODUCT OF EXAMPLE 14 IN MICE.—Continued

| Dose level: | Mice No. | Col. I | Col. II | Col. III | | |
|---|---|---|---|---|---|---|
| | 21 | 67 A-41 | 3/9 | 33.3% | Avg. | 66.7% |
| | 22 | | 17/17 | 100% | | |
| | 23 | 68 A-150 | 45/45 | 100% | Avg. | 100% |
| | 24 | | 43/43 | 100% | | |
| | 25 | | 14/14 | 100% | | |
| 20mg/kg. | 66 A-319 | 48/48 | 100% | | Avg. | 00% |
| | | 164/164 | 100% | | | |
| | | 113/113 | 100% | | | |
| | 67 A-31 | 15/15 | 100% | | Avg. | 00% |
| | | 62/62 | 100% | | | |
| | | 80/80 | 100% | | | |
| | 67 A-32 | 6/6 | 100% | | Avg. | 00% |
| | | 19/19 | 100% | | | |
| | | 21/21 | 100% | | | |
| 200mg/kg. | 66 A-307 | 393/393 | 100% | | Avg. | 00% |
| | | 76/76 | 100% | | | |
| | | 246/246 | 100% | | | |

We claim:

1. A nematocidal composition which contains a nematocidally effective amount of a compound of the formula

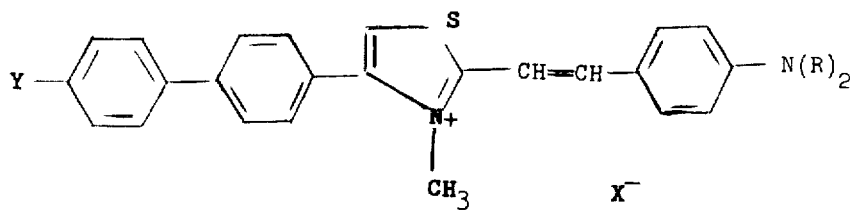

where Y is hydrogen, where R is methyl and where $X^-$ is an anion of a pharmaceutically acceptable acid and a carrier therefor suitable for oral administration.

2. The composition of claim 1 in which $X^-$ is selected from the group consisting of Cl, Br, I, $SO_4$ and MeO$SO_3$.

3. The composition of claim 1 where $X^-$ is $I^-$.

4. The composition of claim 1 in which the carrier is a capsule, tablet, syrup or food.

5. The composition of claim 4 in which the carrier is a capsule or tablet.

6. The composition of claim 2 in which the carrier is a capsule, tablet, syrup or food.

7. The composition of claim 6 in which the carrier is a capsule or tablet.

8. A nematocidal composition which contains a nematocidally effective amount of a compound of the formula where Y is selected from the group consisting of lower alkoxy and hydrogen, wherein R' is lower alkyl and where $X^-$ is an anion of a pharmaceutically acceptable acid and a carrier therefore suitable for oral administration.

9. The composition of claim 8 in which the carrier is a capsule, tablet, syrup or food.

10. The composition of claim 8 in which $X^-$ is Cl, Br, I, $SO_4$ or MeO$SO_3$.

11. The composition of claim 10 in which the carrier is a capsule, tablet, syrup or food.

12. The composition of claim 8 where R' is ethyl, and Y is hydrogen.

13. The composition according to claim 12 in which $X^-$ is I.

14. The composition of claim 12 in which $X^-$ is Cl, Br, I, $SO_4$ or MeO$SO_3$.

15. The composition of claim 12 in which the carrier is a capsule, tablet, syrup or food.

16. The composition of claim 13 in which the carrier is a capsule or tablet.

17. The method of eliminating parasitic nematodes infesting the intenstinal tract of a mammal which com-

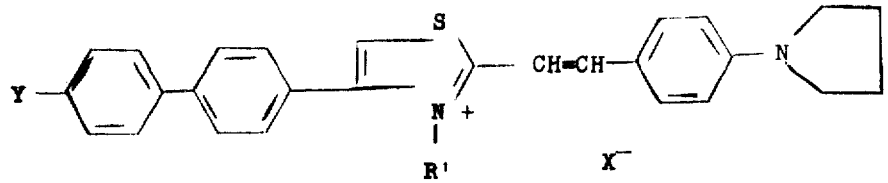

prises orally administering to said mammal a nematocidally effective amount of the compound

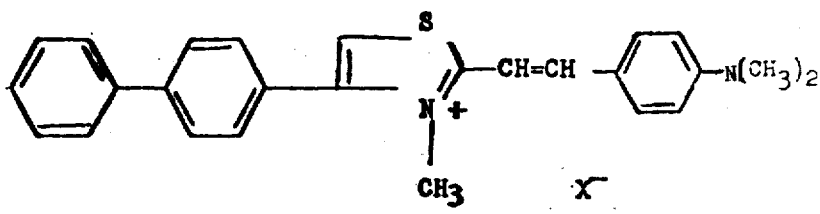

where X⁻ is an anion of a pharmaceutically acceptable acid.

18. The method of claim 17 wherein X⁻ is selected from the group consisting of Cl, B_r, I, SO₄, and MeOSO₃.

19. The method claim 18 in which the amount of compound administered is 5 to 25 mg. of cation per kg. of mammal bodyweight.

20. The method of claim 17 where the nematodes are hookworms.

21. The method of claim 17 where the mammal is a dog.

22. The method of claim 21 in which the nematodes are hookworms.

23. The method of claim 22 in which the amount of compound administered is 5 to 25 mg/kg cation/kg of mammal bodyweight.

24. The method of claim 21 in which the amount of compound administered is 5 to 25 mg. of cation per kg. of mammal bodyweight.

25. The method of claim 21 wherein X is selected from the group consisting of Cl, B_r, I, SO₄ and MeOSO₃.

26. The method of claim 25 in which the nematodes are hookworms.

27. The method of claim 26 in which the amount of compound administered is 5 to 25 mg. of cation per kg. of mammal bodyweight.

28. The method of claim 20 wherin the compound is administered in an amount of 5 to 25 mg/kg cation of animal bodyweight.

29. The method of claim 20 wherein X is selected from the group consisting of Cl, B_r, I, SO₄ and MeOSO₃.

30. The method of eliminating parasitic nematodes infesting the intestinal tract of a mammal which comprises orally administering to said mammal a nematocidally effective amount of a compound of the formula where Y is selected from the group consisting of hydrogen and lower alkoxy, where R' is lower alkyl, and

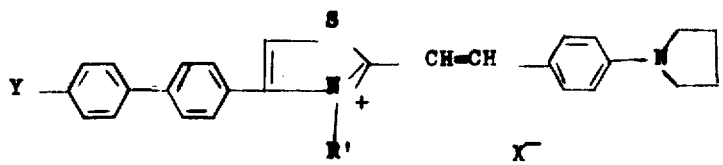

where X⁻ is an anion of a pharmaceutically acceptable acid.

31. The method of claim 30 in which the compound is administered in the amount of 5 to 25 mg. of cation per kg. of mammal bodyweight.

32. The method of claim 31 in which X⁻ is selected from the group consisting of Cl, B_r, I, SO₄, and MeOSO₃.

33. The method of claim 32 in which the nematodes are pinworms.

34. The method of claim 30 wherein the nematodes are pinworms.

35. The method of claim 34 in which the compound is administered in the amount of 5 to 25 mg. of cation per kg. of mammal bodyweight.

36. The method of claim 30 in which X⁻ is selected from the group consisting of Cl, B_r, I, SO₄, and MeOSO₃.

37. The method of claim 36 in which the nematodes are pinworms.

38. The method of claim 30 wherein Y is hydrogen and R' is ethyl.

39. The method of claim 38 in which X⁻ is selected from the group consisting of Cl, B_r, I, SO₄ and MeOSO₃.

40. The method of claim 39 in which the compound is administered in the amount of 5 to 25 mg. of cation per kg. of mammal bodyweight.

41. The method of claim 38 in which the nematodes are pinworms.

42. The method of claim 41 in which X⁻ is selected from the group consisting of Cl, B_r, I, SO₄ and MeOSO₃.

43. The method of claim 42 in which the compound is administered in the amount of 5 to 25 mg. of cation per kg. of mammal bodyweight.

* * * * *